(12) United States Patent
No et al.

(10) Patent No.: US 9,360,692 B2
(45) Date of Patent: Jun. 7, 2016

(54) DISPLAY DEVICE AND DRIVING METHOD THEREOF

(71) Applicant: Samsung Display Co., Ltd., Yongin, Gyeonggi-do (KR)

(72) Inventors: Sang Yong No, Asan-si (KR); Jang Soo Kim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 113 days.

(21) Appl. No.: 13/737,602

(22) Filed: Jan. 9, 2013

(65) Prior Publication Data

US 2014/0049713 A1 Feb. 20, 2014

(30) Foreign Application Priority Data

Aug. 16, 2012 (KR) .................. 10-2012-0089633

(51) Int. Cl.
*G09G 3/36* (2006.01)
*G02F 1/133* (2006.01)

(52) U.S. Cl.
CPC .......... *G02F 1/13306* (2013.01); *G09G 3/3659* (2013.01); *G09G 2300/023* (2013.01); *G09G 2300/0443* (2013.01); *G09G 2300/0447* (2013.01); *G09G 2300/0804* (2013.01); *G09G 2300/0814* (2013.01); *G09G 2300/0852* (2013.01)

(58) Field of Classification Search
CPC ....... G09G 3/3233; G09G 3/364; G09G 3/30; G09G 2320/0276; G09G 2320/0673
USPC ................ 345/89, 90, 93, 100, 204, 690, 694
See application file for complete search history.

(56) References Cited

U.S. PATENT DOCUMENTS

| | | | |
|---|---|---|---|
| 7,843,520 B2 | 11/2010 | Lu et al. | |
| 7,880,823 B2 | 2/2011 | Kim et al. | |
| 8,179,349 B2 | 5/2012 | Liao et al. | |
| 2007/0058123 A1 | 3/2007 | Um et al. | |
| 2007/0273677 A1* | 11/2007 | Kim | 345/204 |
| 2008/0180385 A1* | 7/2008 | Yoshida et al. | 345/102 |
| 2010/0141860 A1 | 6/2010 | Kim et al. | |
| 2010/0225842 A1 | 9/2010 | Hur et al. | |
| 2011/0085105 A1 | 4/2011 | Park et al. | |
| 2011/0128460 A1 | 6/2011 | Cho et al. | |
| 2011/0221988 A1 | 9/2011 | Cho et al. | |
| 2012/0033148 A1 | 2/2012 | Yang et al. | |
| 2012/0169787 A1* | 7/2012 | Chen | 345/690 |

* cited by examiner

*Primary Examiner* — Premal Patel
(74) *Attorney, Agent, or Firm* — Innovation Counsel LLP

(57) ABSTRACT

A display device includes: a display panel including a pixel that includes a first subpixel and a second subpixel, the first subpixel displaying a first image based on a first gamma curve during a first period of a first frame and the second subpixel displaying a second image based on a second gamma curve during the first period of the first frame, where the first and second gamma curves are different; a gate driver configured to transmit a gate signal to the display panel; and a data driver configured to transmit a first data voltage based on the first gamma curve and a second data voltage based on the second gamma curve to the pixel, in which the pixel includes a voltage changing member which changes luminance of at least one of the first image and the second image during a second period of the first frame.

15 Claims, 15 Drawing Sheets

DISPLAY DEVICE AND DRIVING METHOD THEREOF

CROSS-REFERENCE TO RELATED APPLICATION

This application claims priority to and the benefit of Korean Patent Application No. 10-2012-0089633 filed in the Korean Intellectual Property Office on Aug. 16, 2012, the entire contents of which are incorporated herein by reference.

BACKGROUND OF THE INVENTION (a) Field of the Invention

The present invention relates to a display device and a driving method thereof, and more particularly, to a display device with improved visibility and a driving method thereof.

(b) Description of the Related Art

Display devices such as liquid crystal displays (LCD) and organic light emitting diode displays generally include a display panel having a plurality of pixels, switching elements and signal lines, a gray voltage generator generating a gray reference voltage, and a data driver. The data driver generates a plurality of gray voltages by using the gray reference voltage, and then applies a gray voltage corresponding to an input image signal to a data line as a data signal.

Liquid crystal displays include two display panels, one with pixel electrodes and on with an opposed electrode, and a liquid crystal layer having dielectric anisotropy interposed between the display panels. The pixel electrodes are arranged in a matrix form and are connected to switching elements such as thin film transistors (TFT) so that they receive data voltages for each row in sequence. The opposed electrode is formed throughout the entire surface of the display panel and receives a common voltage Vcom. An electric field is generated across the liquid crystal layer by applying voltages to the pixel electrode and the opposed electrode. The transmittance of light passing through the liquid crystal layer is controlled by controlling the intensity of the electric field, thereby acquiring a desired image.

In the liquid crystal display, the visibility of an image viewed from a side of the display is deteriorated as compared with visibility of the image when viewed directly in front of the display. To improve side visibility, a method of dividing one pixel into two subpixels and varying voltages of the two subpixels is used.

The above information disclosed in this Background section is only for enhancement of understanding of the background and therefore it may contain information that does not form the prior art that is already known to a person of ordinary skill in the art.

SUMMARY OF THE INVENTION

A display device and driving method thereof are provided in which the display has improved transmittance and side visibility.

A display device includes: a display panel including a pixel, the pixel including a first subpixel and a second subpixel, the first subpixel configured to display a first image based on a first gamma curve during a first period of a first frame and the second subpixel configured to display a second image based on a second gamma curve during the first period of the first frame, the first gamma curve is different from the second gamma curve; a gate driver configured to transmit a gate signal to the display panel; and a data driver configured to transmit a first data voltage based on the first gamma curve and a second data voltage based on the second gamma curve to the pixel, in which the pixel includes a voltage changing member which changes luminance of at least one of the first image and the second image during a second period of the first frame.

The display panel may further include a main-gate line and a sub-gate line which are connected with the pixel, and a first gate signal transmitted by the main-gate line and a second gate signal transmitted by the sub-gate line may be different from each other.

The first period may begin when the first gate signal is a gate-on voltage, and the second period may begin when the second gate signal is the gate-on voltage.

A phase difference between the gate-on voltage of the first gate signal and the gate-on voltage of the second gate signal which are input to the pixel for the first frame may be from about ⅕ to about ½ of a total duration of the first frame.

The voltage changing member may include a down switching element including a control electrode connected with the sub-gate line.

The voltage changing member may further include a first down capacitor connected to an output terminal of the down switching element and a terminal of a reference voltage.

The first subpixel may include a first switching element connected with the main-gate line and a data line transmitting at least one of the first data voltage and the second data voltage, and a first liquid crystal capacitor connected with the first switching element, the second subpixel may include a second switching element connected with the main-gate line and the data line, a second liquid crystal capacitor connected with the second switching element, and a dividing switching element connected to the second liquid crystal capacitor and the terminal of the reference voltage, and an input terminal of the down switching element may be connected with the second liquid crystal capacitor.

The first subpixel may include a first switching element connected to the main-gate line and a first data line transmitting the first data voltage and a first liquid crystal capacitor connected with the first switching element, the second subpixel may include a second switching element connected to the main-gate line and a second data line transmitting the second data voltage and a second liquid crystal capacitor connected with the second switching element, and an input terminal of the down switching element may be connected with the second liquid crystal capacitor.

The main-gate line may include a first main-gate line connected to the first subpixel and a second main-gate line connected to the second subpixel, the first subpixel may include a first switching element connected with the first main-gate line and a data line transmitting the data voltage and a first liquid crystal capacitor connected with the first switching element, the second subpixel may include a second switching element connected with the second main-gate line and the data line and a second liquid crystal capacitor connected with the second switching element, and an input terminal of the down switching element may be connected with the second liquid crystal capacitor.

The display device may further include a second down capacitor connected between the first liquid crystal capacitor and the second liquid crystal capacitor.

A driving method of a display device including a pixel, the pixel including a first subpixel and a second subpixel, includes: during a first period of a first frame, displaying a first image based on a first gamma curve in the first subpixel and displaying a second image based on a second gamma curve in the second subpixel; and during a second period of the first frame, changing a luminance of at least one of the first image displayed in the first pixel and the second image displayed in the second pixel.

The driving method may further include applying a first gate signal to the pixel when the first period of the first frame begins; and applying a second gate signal to the pixel when the second period of the first frame begins.

A phase difference between a gate-on voltage of the first gate signal and a gate-on voltage of the second gate signal may be from about ⅕ to about ½ a total duration of the first frame.

The driving method may further include applying a same data voltage to the first subpixel and the second subpixel via a same data line for the first period; and charging the second subpixel with a divided voltage of the data voltage.

The driving method may further include applying a first data voltage based on the first gamma curve to the first subpixel and a second data voltage based on a second gamma curve to the second subpixel via a same data line at different times for the first period.

The driving method may further include applying a first data voltage based on the first gamma curve to the first subpixel and a second data voltage based on a second gamma curve to the second subpixel via different data lines for the first period.

According to the exemplary embodiments, the display quality of a display device is enhanced by improving transmittance and side visibility of the display device.

DETAILED DESCRIPTION OF THE EMBODIMENTS

Figure 1:
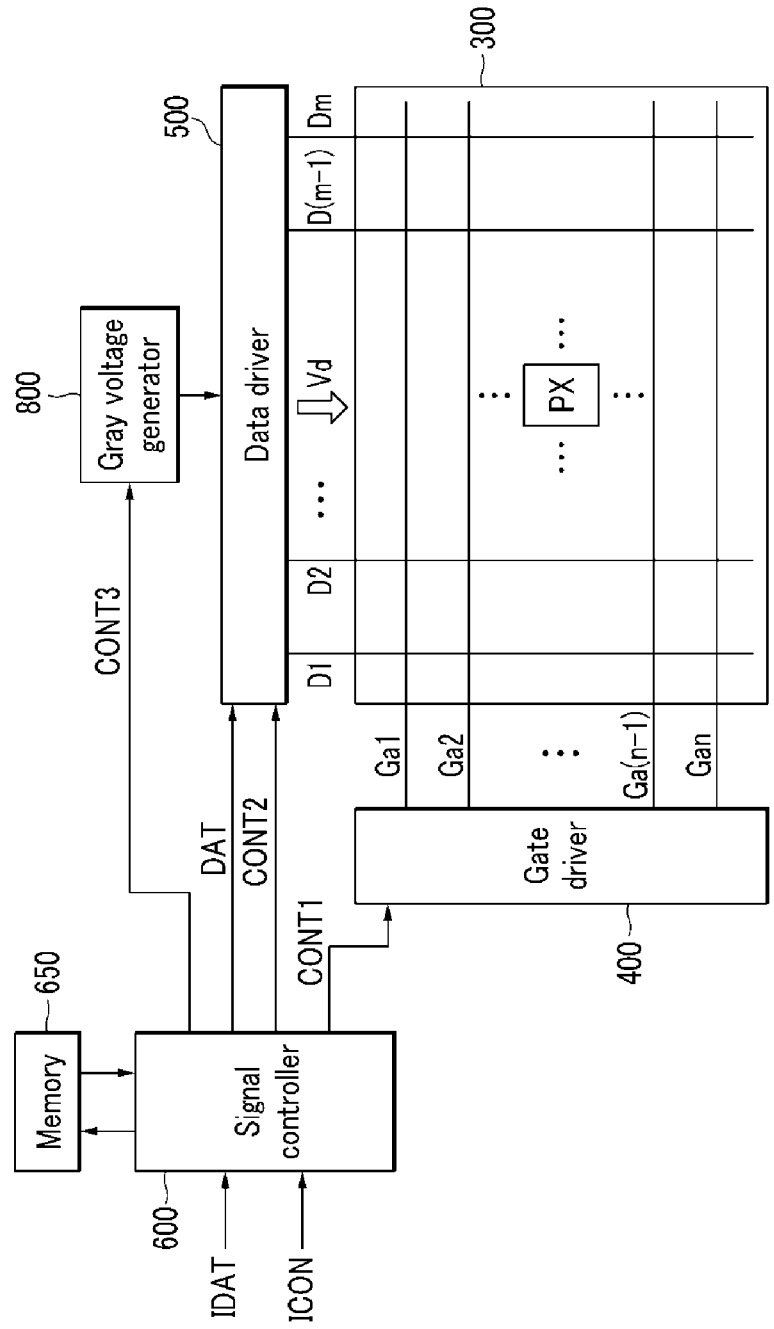
FIG. 1 is a block diagram of a display device according to an exemplary embodiment.

The exemplary embodiments will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a display device and a driving method thereof according to an exemplary embodiment will be described in detail with reference to the drawings.

First, a display device according to an exemplary embodiment will be described with reference to FIGS. 1 to 3.

Figure 2:
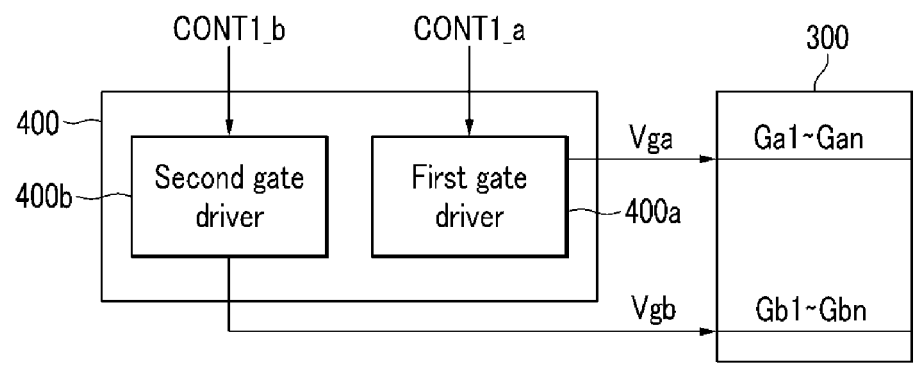
FIG. 2 is a block diagram of a gate driver according to an exemplary embodiment.
Figure 3:
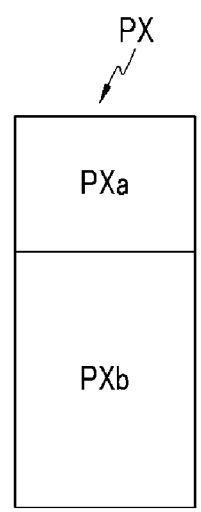
FIG. 3 is a diagram illustrating two subpixels included in one pixel of the display device according to an exemplary embodiment.

FIG. 1 is a block diagram of a display device according to an exemplary embodiment, FIG. 2 is a block diagram of a gate driver according to an exemplary embodiment, and FIG. 3 is a diagram illustrating two subpixels included in one pixel of the display device according to an exemplary embodiment.

Referring to FIG. 1, a display device includes a display panel 300, a gate driver 400 and a data driver 500 which are connected to the display panel 300, a gray voltage generator 800 connected to the data driver 500, a signal controller 600 controlling the gate driver 400, the data driver 500 and gray voltage generator 800, and a memory 650 connected with the signal controller 600.

The display panel 300 include a plurality of signal lines and a plurality of pixels PX which are connected to the signal lines and arranged in an approximately matrix form. In the case where display device is a liquid crystal display, the display panel 300 may include lower and upper display panels (not shown) which face each other, and a liquid crystal layer (not shown) interposed between the two display panels when viewed from a cross-sectional structure.

The signal lines include a plurality of main-gate lines Ga1-Gan transmitting gate signals and a plurality of data lines D1-Dm transmitting data voltages. The signal lines may further include a plurality of sub-gate lines Gb1-Gbn (FIG. 2) transmitting gate signals, which are independent of the main-gate lines Ga1-Gan.

One pixel PX may include at least one switching element connected to at least one data line D1-Dm and at least one main-gate line Ga1-Gan and at least one pixel electrode. The switching element may include at least one thin film transistor and be controlled according to a gate signal transmitted by the main-gate line Ga1-Gan to transmit a data voltage Vd transmitted by the data line D1-Dm to the pixel electrode. The one pixel PX may further include a least one switching element connected to the sub-gate line Gb1-Gbn.

Referring to FIG. 3, one pixel PX of the display device includes a first subpixel PXa and a second subpixel PXb. The first subpixel PXa and the second subpixel PXb may display images derived using different gamma curves but for one input image signal IDAT for at least a partial period of one frame. That is, during at least part of the frame, the first subpixel displays an image derived from an input image signal IDAT for that frame using a first gamma curve and the second subpixel displays an image derived from the same input image signal IDAT but using a second gamma curve that is different from the first gamma curve. Further, luminance of the image displayed by at least one of the first subpixel PXa and the second subpixel PXb may be changed at least one time for one frame by a voltage changing member included in the corresponding pixel PX.

Areas of the first subpixel PXa and the second subpixel PXb may be the same as each other and may be different from each other.

The gate driver 400 is connected to the main-gate lines Ga1-Gan to apply gate signals configured in combination of a gate-on voltage Von and a gate-off voltage Voff to the main-gate lines Ga1-Gan.

Referring to FIG. 2, the gate driver 400 according to an exemplary embodiment may include a first gate driver 400a and a second gate driver 400b. The first gate driver 400a may apply a first gate signal Vga to the main-gate lines Ga1-Gan of the display panel 300, and the second gate driver 400b may apply a second gate signal Vgb to the sub-gate lines Gb1-Gbn of the display panel 300. A waveform of the second gate signal Vgb and a waveform of the first gate signal Vga may have a phase difference which is not 0. The phase difference between the waveform of the second gate signal Vgb and the waveform of the first gate signal Vga may be ⅓ frame to ½ frame, but is not limited thereto, and may be controlled by a desired display characteristic.

The memory 650 is connected to the signal controller 600 to store gamma data for a gamma curve and transmit the gamma data to the signal controller 600. The gamma curve is a curve representing luminance or transmittance values for various gray values corresponding to the input image signal IDAT, and a gray voltage or a reference gray voltage may be determined based thereon. The gamma data stored in the memory 650 may include gamma data for one gamma curve or two or more different gamma curves. Unlike those shown in FIG. 1, the memory 650 may be included in the signal controller 600 or the gray voltage generator 800 and may be included in the data driver 500.

The gray voltage generator 800 generates overall gray voltages or a predetermined number of gray voltages (referred to as reference gray voltages) related to transmittance of the pixel PX. The (reference) gray voltages may have positive values and negative values for common voltages Vcom. The gray voltage generator 800 receives gamma data from the signal controller 600 to generate the (reference) gray voltages based on the gamma data.

According to another exemplary embodiment, the gray voltage generator 800 may be included in the data driver 500.

The data driver 500 is connected with the data lines D1-Dm to select the gray voltage from the gray voltage generator 800 and apply the selected gray voltage to the data lines D1-Dm as the data voltage Vd. However, in the case where the gray voltage generator 800 supplies only a predetermined number of reference gray voltages, the data driver 500 divides the reference gray voltages to generate gray voltages for all grays and select the data voltage Vd among them.

The signal controller 600 controls operations of the gate driver 400, the data driver 500, and the like.

Operation of the display device will be described with reference to FIG. 4 together with FIGS. 1 to 3 described above.

Figure 4:
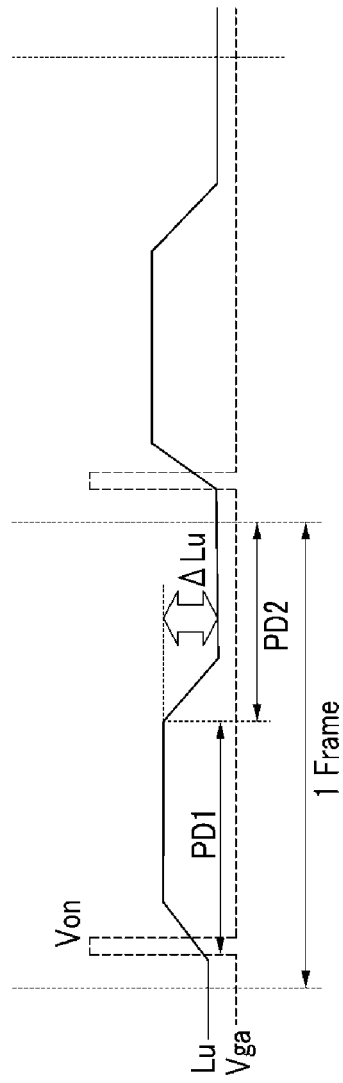
FIG. 4 is a diagram illustrating a change in luminance of an image displayed by one subpixel included in one pixel of the display device according to an exemplary embodiment.

FIG. 4 is a diagram illustrating a change in luminance of an image displayed by one subpixel included in one pixel of the display device according to an exemplary embodiment.

The signal controller 600 receives the input image signal IDAT and an input control signal ICON controlling a display thereof from outside of the signal controller 600. The input image signal IDAT stores the luminance information of each pixel PX, and the luminance has a predetermined number of grays. An example of the input control signal ICON includes a vertical synchronization signal, a horizontal synchronizing signal, a main clock signal, a data enable signal, and the like.

The signal controller 600 processes the input image signal IDAT based on the input image signal IDAT and the input control signal ICON for one frame to convert the processed input image signal IDAT into the output image signal DAT. The signal controller 600 also generates a gate control signal CONT1, a data control signal CONT2, a gamma control signal CONT3, and the like based on the input image signal IDAT and the input control signal ICON for one frame. The gate control signal CONT1 may include a first gate control signal CONT1_a and a second gate control signal CONT1_b.

The signal controller 600 transmits the gate control signal CONT1 to the gate driver 400, transmits the data control signal CONT2 and the output image signal DAT to the data driver 500, and transmits the gamma control signal CONT3 to the gray voltage generator 800. When the gate driver 400 includes the first and second gate drivers 400a and 400b, the signal controller 600 may transmit the first gate control signal CONT1_a to the first gate driver 400a and the second gate control signal CONT1_b to the second gate driver 400b. The gamma control signal CONT3 may include gamma data stored in the memory 650.

The gray voltage generator 800 generates gray voltages or a predetermined number of reference gray voltages based upon the gamma control signal CONT3. The generated gray voltages will be transmitted to the data driver 500. Different gamma curves may be used, and gray voltages may be prepared based on the different gamma curves. The gamma curve used to prepare the gray voltages is selected through a separate selection process (to be described below) and once selected, the gray voltage for the gamma curve selected may be generated.

The data driver 500 receives output image signals DAT for the pixels PX of one row according to the data control signal CONT2 from the signal controller 600, converts the output image signal DAT into an analog data voltage Vd by selecting the gray voltage corresponding to each output image signal DAT, and then applies the converted analog data voltage Vd to the corresponding data lines D1-Dm.

The data voltage Vd may include first and second data voltages that are obtained using different gamma curves. The first and second data voltages obtained using different gamma curves may be applied to the data lines D1-Dm at the same time and may be applied to one data line D1-Dm at different times.

Referring to FIG. 4, the gate driver 400 applies the gate-on voltage Von to the main-gate lines Ga1-Gan according to the first gate control signal CONT1_a from the signal controller 600 to turn on the switching element connected thereto. Then, the data voltage Vd applied to the data lines D1-Dm is applied to the corresponding pixel PX through the turned-on switching element. When the data voltage Vd is applied to the pixel PX, the pixel PX may display the luminance corresponding to the data voltage Vd through various optical conversion elements for a first period PD1 of one frame. For example, in the case of the liquid crystal display, the luminance corresponding to a gray of the input image signal IDAT of one frame may be displayed by controlling an inclination degree of the liquid crystal molecules of the liquid crystal layer and controlling polarization of light.

The first period PD1 begins from the beginning of one frame to continue until the middle of the corresponding frame. The first period PD1 may have a duration of ⅕ to ½ of the total duration of the frame, but is not limited thereto and may be controlled according to a display characteristic such as desired visibility.

In this case, the first and second subpixels PXa and PXb of one pixel PX may display images having luminances that are based on different gamma curves. In particular, when an input image signal IDAT has a value corresponding to an intermediate gray (as referred to herein, "intermediate gray" is a gray that excludes both a minimum gray and a maximum gray), voltages charged in the first and second subpixels PXa and PXb of one pixel PX may be different from each other for the first period PD1. Luminances of the first and second subpixels PXa and PXb may be substantially equivalent to each other in the minimum gray while luminances of the first and second subpixels PXa and PXb may be different from each other in the maximum gray. In view of charged voltages, however, the voltages charged in the first and second subpixels PXa and PXb may be different in the minimum gray, but the luminances of the first and second subpixels PXa and PXb may be substantilly the same as each other since voltage difference in some degree, which depends on the threshold voltage of the liquid crystal, is not represented as a luminance difference. Also, the luminances of the images displayed by the first and second subpixels PXa and PXb of one pixel PX may also be based on different predetermined gamma curves, respectively.

The data lines D1-Dm are used to transmit the same data voltage to the first and second subpixels PXa and PXb of one pixel PX and also the different first and second data voltages to the first and second subpixels PXa and PXb. When the different first and second data voltages are transmitted to the first and second subpixels PXa and PXb of one pixel PX, the first and second data voltages are transmitted to the first and second subpixels PXa and PXb through the same data line at different times or, alternatively, they may be transmitted to the first and second subpixels PXa and PXb through different data lines, respectively.

Next, the gate driver 400 applies the gate-on voltage Von to the sub-gate lines Gb1-Gbn according to the second gate control signal CONT1_b from the signal controller 600 to turn on the switching element connected thereto. Then, the first period PD1 ends and a second period PD2 of the corresponding frame begins. For the second period PD2, luminance Lu of at least one of the first subpixel PXa and the second subpixel PXb is changed by the voltage changing member included in the pixel PX. In detail, as shown in FIG. 4, when the second period PD2 begins, the luminance Lu of at least one of the first subpixel PXa and the second subpixel PXb included in one pixel PX may be decreased by a luminance difference ΔLu.

Thus, the luminances of the first and second subpixels PXa and PXb displayed during the first period PD1 and the second period PD2 of one frame for one input image signal IDAT may included at least three different luminances which are temporally and spatially divided and displayed, and when the luminances are properly controlled, an image viewed from the side may be maximally close in visibility to an image viewed from the front, thereby improving side visibility of the display device, such as a liquid crystal display. Further, an effect of time division is increased by controlling a time of the first period PD1 in one frame, thereby optimizing the side visibility.

The process is repeated by a 1 horizontal period (which is written as "1H" and is the same as one period of the horizontal synchronizing signal Hsync and the data enable signal DE), and thus the gate-on voltages Von are sequentially applied to all of the main-gate lines Ga1-Gan and the sub-gate lines Gb1-Gbn, and the data voltages Vd are applied to all of the pixels PX to display images of one frame.

One frame ends and the next frame begins, and the state of an inversion signal included in the data control signal CONT2 may be controlled so that the polarity of the data voltage Vd applied to each pixel PX is the opposite of the polarity of the previous frame (referred to as a frame inversion). The polarities of the data voltages Vd applied to all of the pixels PX may be inverted every one or more frames. Even within one frame, as controlled by a characteristic of the inversion signal, the polarity of the data voltage Vd flowing through one data line D1-Dm may be periodically changed, or the polarities of the data voltages Vd applied to the data lines D1-Dm of one pixel row may be different from each other.

A detailed structure and a driving method of the display device according to an exemplary embodiment will be described with reference to FIGS. 5 to 7.

Figure 5:
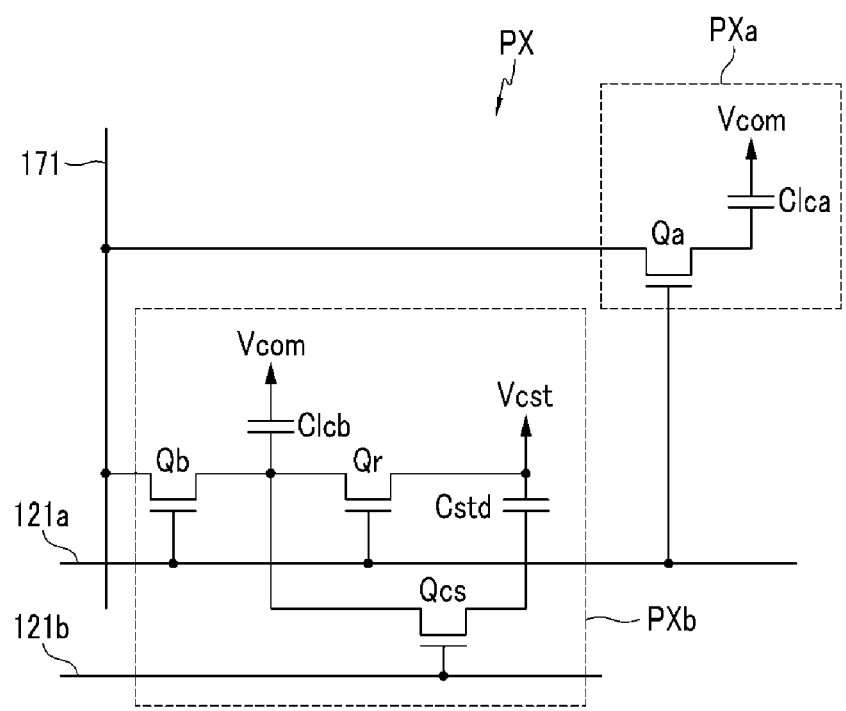
FIG. 5 is an equivalent circuit diagram of one pixel of the display device according to an exemplary embodiment.
Figure 6:
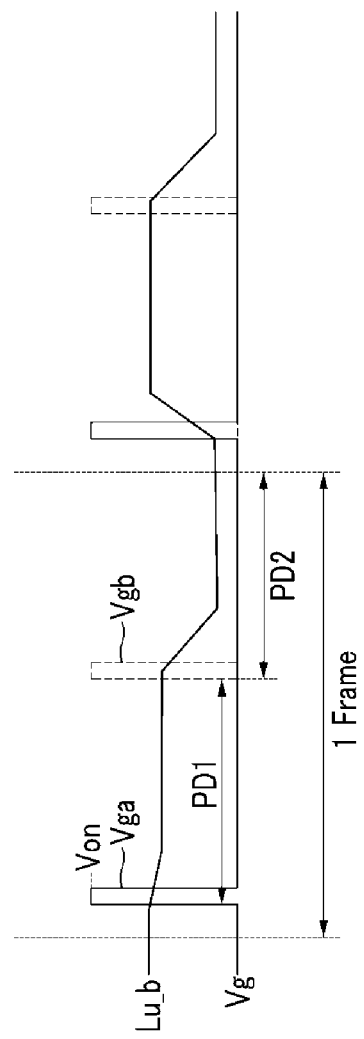
FIG. 6 is a diagram illustrating a change in luminance of a gate signal and an image displayed by one subpixel included in one pixel of the display device according to an exemplary embodiment.
Figure 7:
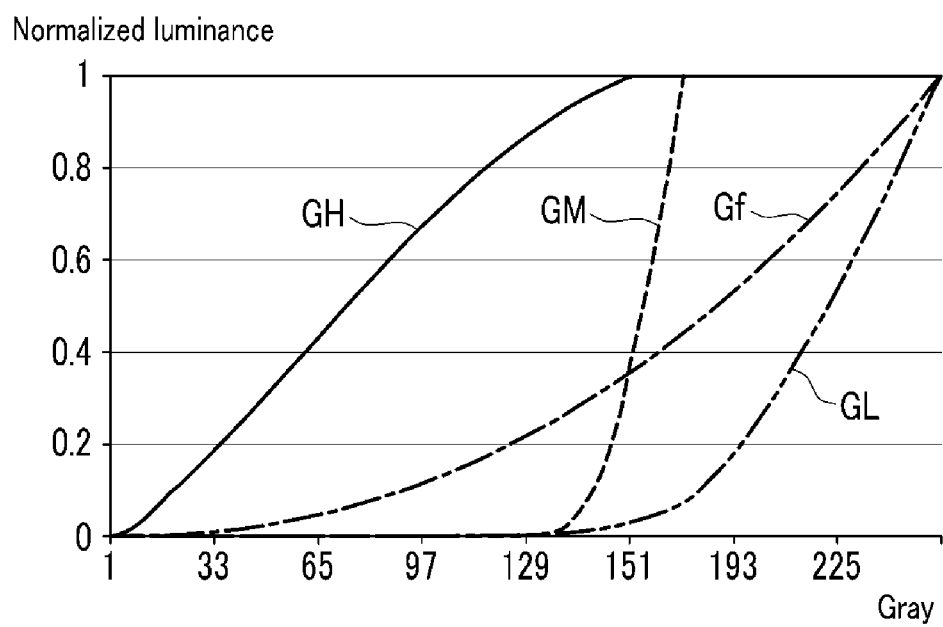
FIG. 7 is a graph illustrating a gamma curve of the display device according to an exemplary embodiment.

FIG. 5 is an equivalent circuit diagram of one pixel of the display device according to an exemplary embodiment, FIG. 6 is a diagram illustrating a change in luminance of a gate signal Vg and an image displayed by one subpixel included in one pixel of the display device according to an exemplary embodiment, and FIG. 7 is a graph illustrating a gamma curve of the display device according to an exemplary embodiment.

Referring to FIG. 5, the display device according to an exemplary embodiment is a liquid crystal display, and one pixel PX includes the first subpixel PXa and the second subpixel PXb. The first subpixel PXa includes a first switching element Qa and a first liquid crystal capacitor Clca, and the second subpixel PXb includes a second switching element Qb, a dividing switching element Qr, a down switching element Qcs, a first down capacitor Cstd, and a second liquid crystal capacitor Clcb.

The first switching element Qa and the second switching element Qb are three-terminal elements such as thin film transistors and include control terminals connected to the main-gate line 121a and input terminals connected to the data line 171, respectively. The output terminal of the first switching element Qa is connected to the first liquid crystal capacitor Clca, and the output terminal of the second switching element Qb is connected to the second liquid crystal capacitor Clcb and an input terminal of the dividing switching element Qr.

The dividing switching element Qr is also a three-terminal element such as a thin film transistor, of which a control terminal is connected to the main-gate line 121a, an input terminal is connected to an output terminal of the second switching element Qb and the second liquid crystal capacitor Clcb, and an output terminal receives a predetermined reference voltage Vcst.

The down switching element Qcs is also a three-terminal element such as a thin film transistor, of which a control terminal is connected to the sub-gate line 121b, an input terminal is connected to the output terminal of the second switching element Qb and the second liquid crystal capacitor Clcb, and an output terminal is connected to one terminal of the first down capacitor Cstd. The other terminal of the first down capacitor Cstd receives the reference voltage Vcst. In this exemplary embodiment, the down switching element Qcs and the first down capacitor Cstd correspond to the voltage changing member described above.

A driving method of the display device according to an exemplary embodiment will be described with reference to FIGS. 5 to 7.

First, when the gate-on voltage Von of the first gate signal Vga is applied to the main-gate line 121a, the first switching element Qa, the second switching element Qb, and the dividing switching element Qr which are connected thereto are turned on, and the first period PD1 of the corresponding frame begins. As a result, the data voltage Vd applied to the data line 171 is applied to a terminal of the first liquid crystal capacitor Clca through the turned-on first switching element Qa. However, a divided voltage between the data voltage Vd and the reference voltage Vcst is applied to a terminal of the second liquid crystal capacitor Clcb. The voltage applied to the terminal of the second liquid crystal capacitor Clcb may depend on the voltage difference between the data voltage Vd and the reference voltage Vcst and resistances of the turned-on second switching element Qb and the turned-on dividing switching element Qr.

Accordingly, the first liquid crystal capacitor Clca is charged by a difference between the data voltage Vd and the common voltage Vcom, and the second liquid crystal capacitor Clcb may be charged by a difference between the divided voltage between the data voltage Vd and the common voltage Vcom. As a result, because the charged voltage of the second liquid crystal capacitor Clcb is smaller than the charged voltage of the first liquid crystal capacitor Clca, the luminances of the first and second subpixels PXa and PXb may be different from each other. When the luminance of the first subpixel PXa is called a first luminance and the luminance of the second subpixel PXb is called a second luminance Lu_b, the second luminance Lu_b may be lower than the first luminance for the first period PD1 in one frame.

The voltage of the first gate signal Vga applied to the main-gate line 121a becomes the gate-off voltage Voff for the first period PD1. Then, the first switching element Qa, the second switching element Qb and the dividing switching element Qr may be turned on, and the terminal connected with the second switching element Qb of the terminals of the second liquid crystal capacitor Clcb may be floated.

After the first period PD1 begins and a predetermined time elapses, when the gate-on voltage Von of the second gate signal Vgb is applied to the sub-gate line 121b, the down switching element Qcs connected thereto is turned on and the second period PD2 of the corresponding frame begins. As a result, a charge of the terminal of the second liquid crystal capacitor Clcb connected with the output terminal of the second switching element Qb flows into the first down capacitor Cstd and then the voltage of the second liquid crystal capacitor Clcb drops down.

In more detail, a case in which the liquid crystal display is driven by frame inversion and in which the data voltage Vd having a positive (+) polarity based on the common voltage Vcom is applied to the data line 171 in the current frame will be described as an example. Because negative (−) charges are collected in the first down capacitor Cstd after the previous frame ends, when the down switching element Qcs is turned on in the current frame, positive (+) charges charged in the second liquid crystal capacitor Clcb flow into the first down capacitor Cstd through the down switching element Qcs, and the negative (−) charges of the first down capacitor Cstd flow into the second liquid crystal capacitor Clcb. As a result, the charged voltage of the second liquid crystal capacitor Clcb drops down. On the other hand, in the next frame, when the down switching element Qcs is turned on in a state where the negative (−) charges are charged in the second liquid crystal capacitor Clcb, the negative (−) charges of the second liquid crystal capacitor Clcb flow into the first down capacitor Cstd, and as a result, the charged voltage of the second liquid crystal capacitor Clcb drops down.

Accordingly, as shown in FIG. 6, the second luminance Lu_b for the second period PD2 of the second subpixel PXb may be lower than the second luminance Lu_b for the first period PD1.

As such, the first luminance of the image displayed by the first subpixel PXa is mostly uniform for one frame, and the second luminance Lu_b of the image displayed by the second subpixel PXb may have two different luminances. The first luminance and two the second luminance Lu_b may be set using different gamma curves as shown in FIG. 7.

FIG. 7 is a diagram illustrating an example of a gamma curve according to an exemplary embodiment and illustrates a first gamma curve GH, a second gamma curve GL, and a third gamma curve GM which are different from each other. Luminance of an image based on the first gamma curve GH may be higher than or the same as luminance of an image based on the third gamma curve GM, and the luminance of the image based on the third gamma curve GM may be higher than or the same as the luminance of an image based on the second gamma curve GL. A composite gamma curve of the images in the first to third gamma curves GH, GL, and GM coincides with a defined front gamma curve Gf so as to be the most suitable for the display device, and a composite gamma curve at the side is controlled to be maximally close to the front gamma curve Gf, thereby improving side visibility. In this case, the first to third gamma curves GH, GL, and GM are controlled so that the composite gamma curve at the side does not have a maximum inflection point and is close to the front gamma curve Gf, thereby improving side visibility.

A detailed structure of the display device according to the exemplary embodiment shown in FIGS. 5 and 6 described above will be described with reference to FIGS. 8 and 9.

Figure 8:
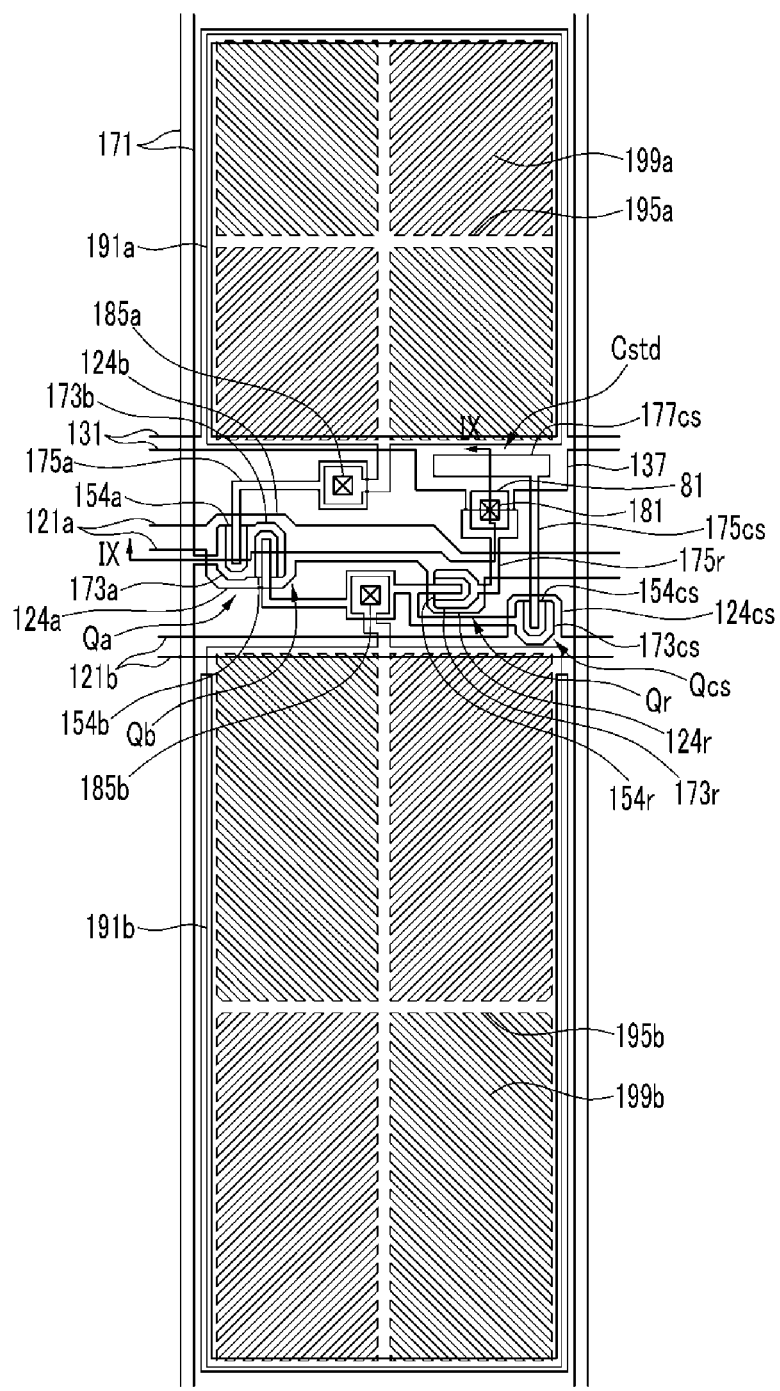
FIG. 8 is a layout view for one pixel of the display device according to an exemplary embodiment.
Figure 9:
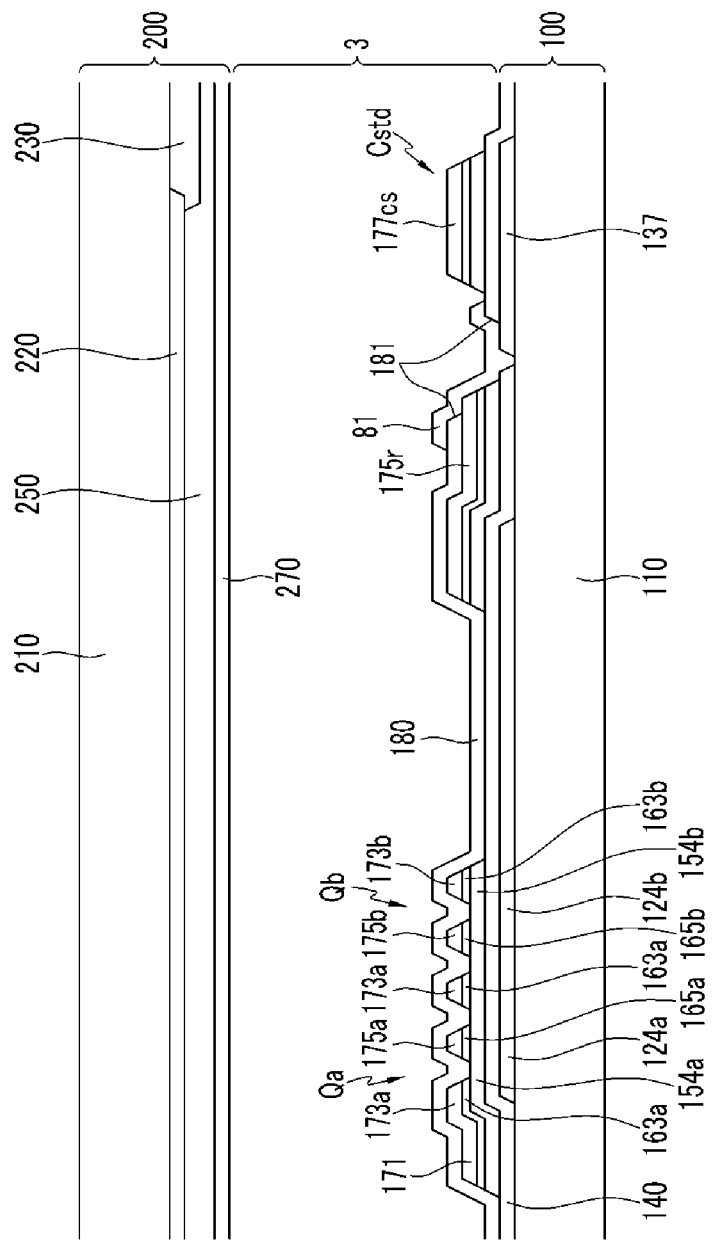
FIG. 9 is a cross-sectional view of the display device of FIG. 8 taken along line IX-IX.

FIG. 8 is a layout view for one pixel of the display device according to an exemplary embodiment, and FIG. 9 is a cross-sectional view of the display device of FIG. 8 taken along line IX-IX.

Referring to FIGS. 8 and 9, the display device according to an exemplary embodiment is a liquid crystal display includes a lower panel 100 and an upper panel 200 which face each other, a liquid crystal layer 3 interposed between the two display panels 100 and 200, and a pair of polarizers (not shown) which is attached to outer surfaces of the display panels 100 and 200.

With respect to the lower panel 100, a gate conductor including a plurality of pairs of main-gate lines 121a and sub-gate lines 121b, and a reference voltage line 131, are positioned on an insulation substrate 110.

One main-gate line 121a and one sub-gate line 121b may be positioned per one pixel row. The main-gate line 121a includes a first gate electrode 124a, a second gate electrode 124b, and a third gate electrode 124r. The sub-gate line 121b includes a fourth gate electrode 124cs.

The reference voltage line 131 transmits a predetermined reference voltage Vcst. The reference voltage line 131 may include an extension 137. The reference voltage Vcst may be larger than the common voltage Vcom, and a difference therebetween may be about 1 V to about 4 V.

The gate insulating layer 140 is positioned on the gate conductor, and a semiconductor layer including a first semiconductor 154a, a second semiconductor 154b, a third semiconductor 154r, and a fourth semiconductor 154cs is positioned thereon.

A plurality of ohmic contacts 163a and 165a and 163b and 165b may be positioned on the semiconductor layer.

A plurality of data lines 171 including a first source electrode 173a and a second source electrode 173b, and a data conductor including a first drain electrode 175a, a second drain electrode 175b, a third source electrode 173r and a third drain electrode 175r, and a fourth source electrode 173cs and a fourth drain electrode 175cs are positioned on the ohmic contacts 163a and 165a and the gate insulating layer 140. The first source electrode 173a and the second source electrode 173b are connected to each other, the second drain electrode 175b and the third source electrode 173r are connected to each other, and the second drain electrode 175b and the fourth source electrode 173cs are connected to each other. An extension 177cs may be included at one end of the fourth drain electrode 175cs. One end of the third drain electrode 175r may be adjacent to a part of the extension 137 of the reference voltage line 131.

The first gate electrode 124a, the first source electrode 173a and the first drain electrode 175a form a first thin film transistor Qa as a first switching element together with the first semiconductor 154a, the second gate electrode 124b, the second source electrode 173b and the second drain electrode 175b form a second thin film transistor Qb as a second switching element together with the second semiconductor 154b, the third gate electrode 124r, the third source electrode 173r and the third drain electrode 175r form a third thin film transistor Qr as a dividing switching element together with the third semiconductor 154r, and the fourth gate electrode 124cs, the fourth source electrode 173cs and the fourth drain electrode 175cs form a fourth thin film transistor Qcs as a down switching element together with the fourth semiconductor 154cs.

The extension 137 of the reference voltage line 131 and the extension 177cs of the fourth drain electrode 175cs, which are overlapped with each other with the gate insulating layer 140 therebetween, form the first down capacitor Cstd.

A passivation layer 180 is positioned on the data conductor and an exposed portion of the semiconductors 154a, 154b, 154r, and 154cs. The passivation layer 180 includes contact holes 185a and 185b exposing the first drain electrode 175a and the second drain electrode 175b, and the gate insulating layer 140. The passivation layer 180 may include a contact hole 181 exposing a part of the third drain electrode 175r and a part of the extension 137 of the reference voltage line 131 which are adjacent to each other.

A first subpixel electrode 191a, a second subpixel electrode 191b, and a contact assistant 81 are positioned on the passivation layer 180.

The first subpixel electrode 191a and the second subpixel electrode 191b may face each other with the main-gate line 121a therebetween. Each of the first and second subpixel electrodes 191a and 191b may include, respectively, cross stems 195a and 195b and a plurality of minute branches 199a and 199b extending from the cross stems 195a and 195b.

The first subpixel electrode 191a and the second subpixel electrode 191b are physically and electrically connected with the first drain electrode 175a and the second drain electrode 175b through the contact holes 185a and 185b, respectively.

The third drain electrode 175r and the extension 137 of the reference voltage line 131 may be connected to each other through the contact assistant 81 in the contact hole 181.

The first subpixel electrode 191a may receive the data voltage Vd from the first drain electrode 175a, and the second subpixel electrode 191b may receive the divided voltage between the data voltage Vd and the reference voltage Vcst.

An area of the second subpixel electrode 191b may be the same as or larger than an area of the first subpixel electrode 191a.

With respect to the upper panel 200, a light blocking member 220 and a color filter 230 may be positioned on an insulation substrate 210. At least one of the light blocking member 220 and the color filter 230 may alternatively be positioned on the lower panel 100.

An overcoat 250 may be positioned on the color filter 230 and the light blocking member 220, but the overcoat 250 may be omitted.

An opposed electrode 270 is formed on the overcoat 250.

Alignment layers are formed on both sides of the display panels 100 and 200 and may be, for example, vertical alignment layers.

The first subpixel electrode 191a forms the first liquid crystal capacitor Clca together with the opposed electrode 270 and the second subpixel electrode 191b forms the second liquid crystal capacitor Clcb together with the opposed electrode 270 to maintain the charged voltage.

A detailed structure and a driving method of the display device according to an exemplary embodiment will be described with reference to FIG. 10. Like reference numerals designate like constituent elements of the exemplary embodiment described above, and repetitive description is omitted.

Figure 10:
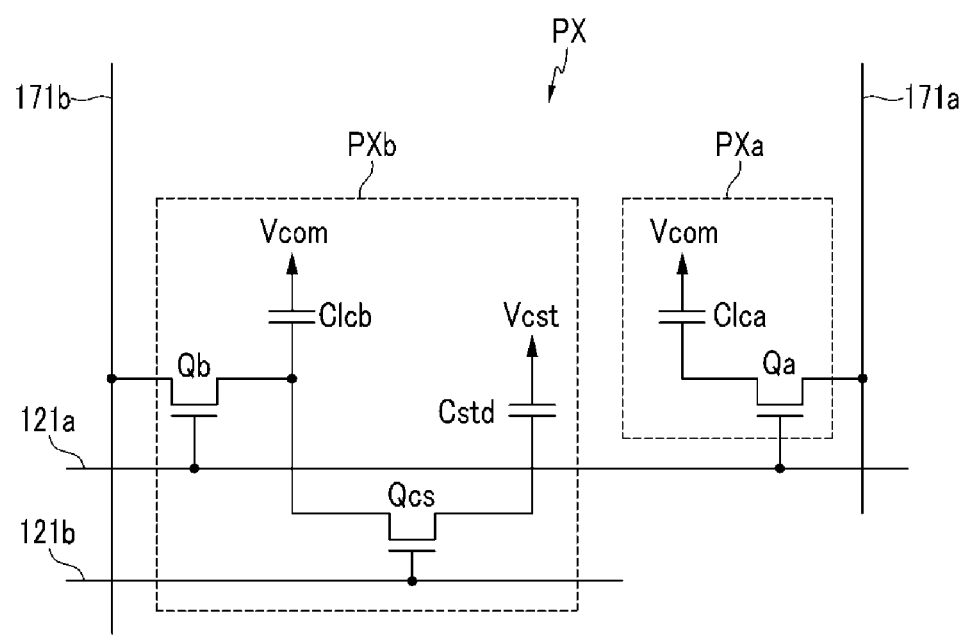
FIG. 10 is an equivalent circuit diagram of one pixel of the display device according to an exemplary embodiment.

FIG. 10 is an equivalent circuit diagram of one pixel of the display device according to an exemplary embodiment.

Referring to FIG. 10, the display device according to this exemplary embodiment is a liquid crystal display, and one pixel PX includes the first subpixel PXa and the second subpixel PXb. The first subpixel PXa includes the first switching element Qa and the first liquid crystal capacitor Clca, and the second subpixel PXb includes the second switching element Qb, down switching element Qcs, the first down capacitor Cstd, and the second liquid crystal capacitor Clcb.

A control terminal of the first switching element Qa is connected to the main-gate line 121a, an input terminal is connected to the first data line 171a, and an output terminal is connected to the first liquid crystal capacitor Clca.

A control terminal of the second switching element Qb is connected to the main-gate line 121a, an input terminal is connected to the second data line 171b, and an output terminal is connected to the second liquid crystal capacitor Clcb and the input terminal of the down switching element Qcs. The first data line 171a and the second data line 171b are separated from each other and may transmit different data voltages Vd for one input image signal IDAT.

A control terminal of the down switching element Qcs is connected with the sub-gate line 121b, an input terminal is connected with the output terminal of the second switching element Qb and the second liquid crystal capacitor Clcb, and an output terminal is connected with one terminal of the first down capacitor Cstd. The other terminal of the first down capacitor Cstd receives the reference voltage Vcst.

A driving method of the display device shown in FIG. 10 will be described with reference to FIG. 10 and FIG. 6 described above.

First, when the gate-on voltage Von of the first gate signal Vga is applied to the main-gate line 121a, the first switching element Qa and the second switching element Qb which are connected thereto are turned on, and the first period PD1 of the corresponding frame begins. As a result, the data voltage applied to the first data line 171a is applied to a terminal of the first liquid crystal capacitor Clca through the turned-on first switching element Qa, and the data voltage applied to the second data line 171b is applied to the terminal of the second liquid crystal capacitor Clcb through the turned-on second switching element Qb. Accordingly, in the case where the data voltages applied to the first data line 171a and the second data line 171b are different from each other, the charged voltage of the first liquid crystal capacitor Clca and the charged voltage of the second liquid crystal capacitor Clcb are different from each other and the luminances of the first and second subpixels PXa and PXb are different from each other. For the first period PD1, the first luminance which is the luminance of the first subpixel PXa may be higher than the second luminance Lu_b which is the luminance of the second subpixel PXb.

The voltage of the first gate signal Vga applied to the main-gate line 121a becomes the gate-off voltage Voff for the first period PD1. Then, the first switching element Qa and the second switching element Qb may be turned off, and a terminal connected with the second switching element Qb of the terminals of the second liquid crystal capacitor Clcb may be floated.

After the first period PD1 begins and after a predetermined time elapses, the gate-on voltage Von of the second gate signal Vgb is applied to the sub-gate line 121b, and thus the down switching element Qcs connected thereto is turned on and the second period PD2 of the corresponding frame begins. As a result, a charge of the terminal of the second liquid crystal capacitor Clcb connected with the output terminal of the second switching element Qb flows into the first down capacitor Cstd and then the voltage of the second liquid crystal capacitor Clcb drops down.

Accordingly, as shown in FIG. 6, the second luminance Lu_b for the second period PD2 of the second subpixel PXb may be lower than the second luminance Lu_b for the first period PD1.

As such, it is possible to improve side visibility by properly controlling different values of the first luminance of the image displayed by the first subpixel PXa and the second luminance Lu_b displayed by the second subpixel PXb for one frame.

According to another exemplary embodiment, a magnitude of the data voltage transmitted by the first data line 171a for one input image signal IDAT may be smaller than a magnitude of the data voltage transmitted by the second data line 171b. In this case, during the first period PD1 of one frame, the first luminance of the first subpixel PXa may be lower than the second luminance Lu_b of the second subpixel PXb.

A detailed structure of the display device according to the exemplary embodiment shown in FIG. 10 will be described with reference to FIG. 11.

Figure 11:
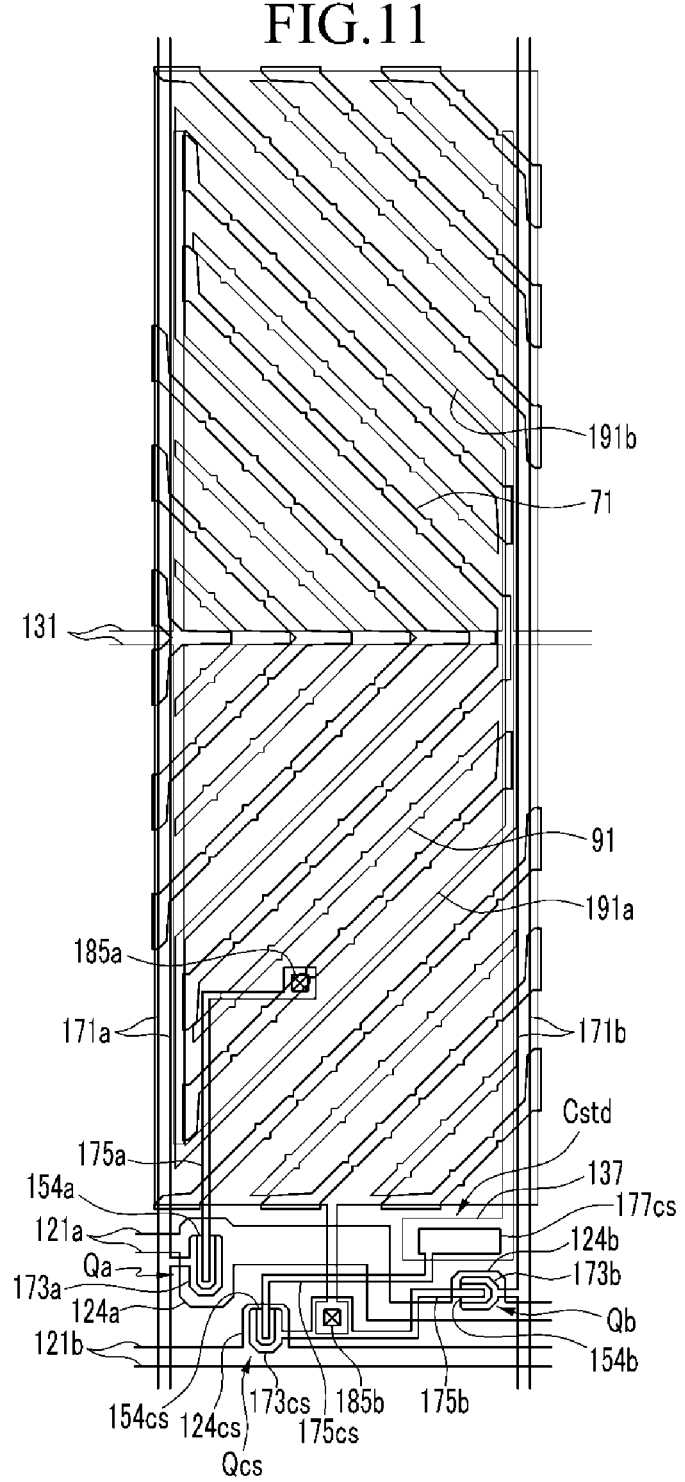
FIG. 11 is a layout view for one pixel of the display device according to an exemplary embodiment.

FIG. 11 is a layout view for one pixel of the display device according to an exemplary embodiment.

The display device according to this exemplary embodiment is a liquid crystal display and may include a lower panel (not shown) and an upper panel (not shown) which face each other and a liquid crystal layer interposed between the two display panels.

With respect to the lower panel, a gate conductor including a plurality of pairs of main-gate lines 121a and sub-gate lines 121b, and a reference voltage line 131, are positioned on an insulation substrate.

The main-gate line 121a includes a first gate electrode 124a and a second gate electrode 124b. The sub-gate line 121b includes a fourth gate electrode 124cs.

The reference voltage line 131 transmits a reference voltage Vcst. The reference voltage line 131 may include an extension 137.

A gate insulating layer (not shown) is positioned on the gate conductor, and a semiconductor layer including a first semiconductor 154a, a second semiconductor 154b, and a fourth semiconductor 154cs is positioned thereon.

A plurality of ohmic contacts (not shown) may be positioned on the semiconductor layer.

A first data line 171a including the first source electrode 173a, a second data line 171b including the second source electrode 173b, and a data conductor including a first drain electrode 175a, a second drain electrode 175b, a fourth source electrode 173cs and a fourth drain electrode 175cs are positioned on the ohmic contacts and the gate insulating layer. The second drain electrode 175b and the fourth source electrode 173cs are connected to each other. The extension 177cs may be included at one end of the fourth drain electrode 175cs.

The first gate electrode 124a, the first source electrode 173a and the first drain electrode 175a form a first thin film transistor Qa as a first switching element together with the first semiconductor 154a. The second gate electrode 124b, the second source electrode 173b and the second drain electrode 175b form a second thin film transistor Qb as a second switching element together with the second semiconductor 154b. The fourth gate electrode 124cs, the fourth source electrode 173cs and the fourth drain electrode 175cs form a fourth thin film transistor Qcs as a down switching element together with the fourth semiconductor 154cs.

The extension 137 of the reference voltage line 131 and the extension 177cs of the fourth drain electrode 175cs, which are overlapped with each other with the gate insulating layer therebetween, form the first down capacitor Cstd.

A passivation layer (not shown) is positioned on the data conductor and an exposed portion of the semiconductors 154a, 154b, 154r, and 154cs. The passivation layer 180 includes contact holes 185a and 185b exposing the first drain electrode 175a and the second drain electrode 175b.

A first subpixel electrode 191a and a second subpixel electrode 191b are positioned on the passivation layer 180. The first subpixel electrode 191a and the second subpixel electrode 191b may be interleaved with each other and may include cutouts 91, respectively.

The first subpixel electrode 191a and the second subpixel electrode 191b are physically and electrically connected with the first drain electrode 175a and the second drain electrode 175b through the contact holes 185a and 185b, respectively, and may receive different data voltages from the first drain electrode 175a and the second drain electrode 175b.

When describing the upper panel, an opposed electrode (not shown) is formed on an insulation substrate (not shown). The opposed electrode may extend substantially in parallel to the cutouts 91 of the first and second subpixel electrodes 191a and 191b and may include cutouts 71 which are arranged alternately with the cutouts 91 of the first and second subpixel electrodes 191a and 191b.

Next, a display device according to an exemplary embodiment will be described with reference to FIG. 12.

Figure 12:
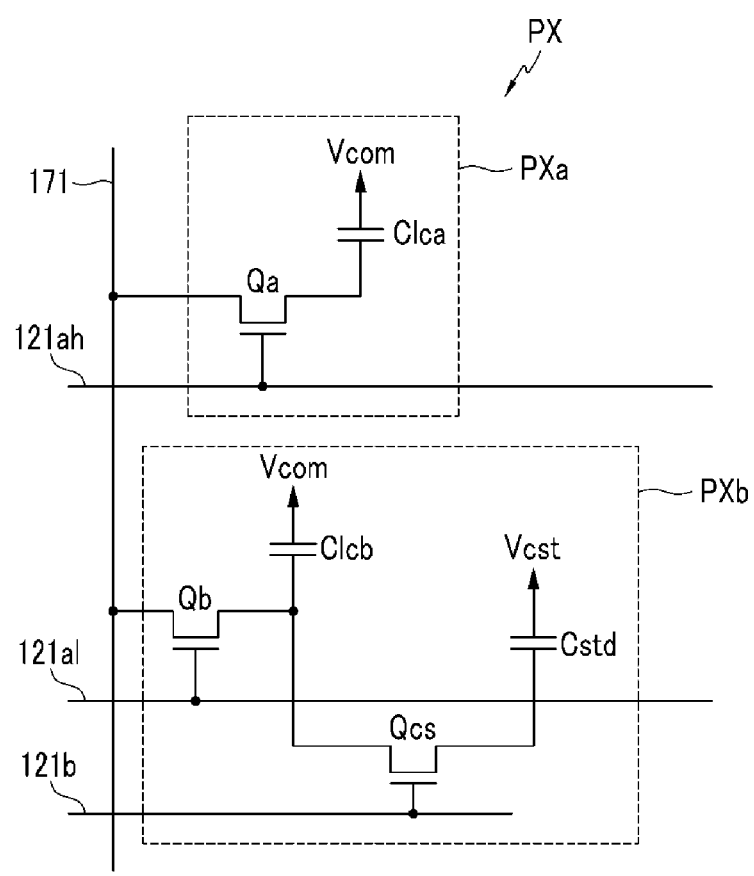
FIG. 12 is an equivalent circuit diagram of one pixel of the display device according to an exemplary embodiment.

FIG. 12 is an equivalent circuit diagram of one pixel of a display device according to an exemplary embodiment.

The exemplary embodiment shown in FIG. 12 is almost the same as the exemplary embodiment shown in FIG. 10 described above, but one pixel PX may be connected to one data line and two main-gate lines, and not connected to two data lines and one main-gate line.

In detail, one pixel PX includes a first subpixel PXa and a second subpixel PXb. The first subpixel PXa includes a first switching element Qa and a first liquid crystal capacitor Clca, and the second subpixel PXb includes a second switching element Qb, a down switching element Qcs, a first down capacitor Cstd, and a second liquid crystal capacitor Clcb.

A control terminal of the first switching element Qa is connected to a first main-gate line 121ah, an input terminal is connected to the data line 171, and an output terminal is connected to the first liquid crystal capacitor Clca.

A control terminal of the second switching element Qb is connected to a second main-gate line 121*al*, an input terminal is connected to the data line 171, and an output terminal is connected to the second liquid crystal capacitor Clcb and the input terminal of the down switching element Qcs. The first main-gate line 121*ah* and the second main-gate line 121*al* are separated from each other and may transmit the first gate signals Vga, respectively.

A control terminal of the down switching element Qcs is connected with the sub-gate line 121*b*, an input terminal is connected with the output terminal of the second switching element Qb and the second liquid crystal capacitor Clcb, and an output terminal is connected with one terminal of the first down capacitor Cstd. The other terminal of the first down capacitor Cstd receives the reference voltage Vcst.

A driving method of the display device shown in FIG. 12 will be described with reference to FIG. 12 and FIG. 6 described above.

When the data voltages Vd based on different gamma curves for one input image signal IDAT are sequentially applied to the data line 171 and the first gate signals Vga are applied to the first main-gate line 121*ah* and the second main-gate line 121*al*, respectively, the first switching element Qa and the second switching element Qb connected thereto are turned on, and the first period PD1 of the corresponding frame begins. As a result, the two different data voltages are applied, respectively, to a terminal of the first liquid crystal capacitor Clca and a terminal of the second liquid crystal capacitor Clcb through the turned-on first switching element Qa and second switching element Qb. Accordingly, the charged voltage of the first liquid crystal capacitor Clca and the charged voltage of the second liquid crystal capacitor Clcb are different from each other for the one input image signal IDAT, and the luminances of the first and second subpixels PXa and PXb are different from each other. For the first period PD1, the first luminance which is the luminance of the first subpixel PXa may be higher than the second luminance Lu_b which is the luminance of the second subpixel PXb.

The voltage of the first gate signal Vga applied to the main-gate line 121*a* becomes the gate-off voltage Voff for the first period PD1. After the first period PD1 begins and after a predetermined time elapses, the gate-on voltage Von of the second gate signal Vgb is applied to the sub-gate line 121*b*, and thus the down switching element Qcs connected thereto is turned on and the second period PD2 of the corresponding frame begins. As a result, a charge of the terminal of the second liquid crystal capacitor Clcb connected with the output terminal of the second switching element Qb flows into the first down capacitor Cstd and then the voltage of the second liquid crystal capacitor Clcb drops down.

Accordingly, as shown in FIG. 6, the second luminance Lu_b for the second period PD2 of the second subpixel PXb may be lower than the second luminance Lu_b for the first period PD1.

As such, it is possible to improve side visibility by properly controlling different values of the first luminance of the image displayed by the first subpixel PXa and the second luminance Lu_b displayed by the second subpixel PXb for one frame.

According to another exemplary embodiment, during the first period PD1, the first luminance of the first subpixel PXa may be lower than the second luminance Lu_b of the second subpixel PXb.

Next, a detailed structure and a driving method of a display device according to an exemplary embodiment will be described with reference to FIGS. 13 and 14.

Figure 13:
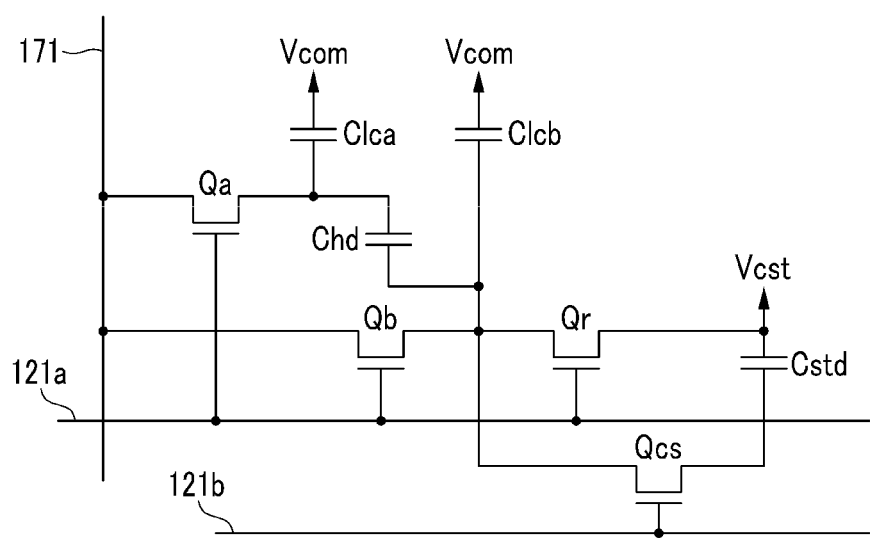
FIG. 13 is an equivalent circuit diagram of one pixel of the display device according to an exemplary embodiment.
Figure 14:
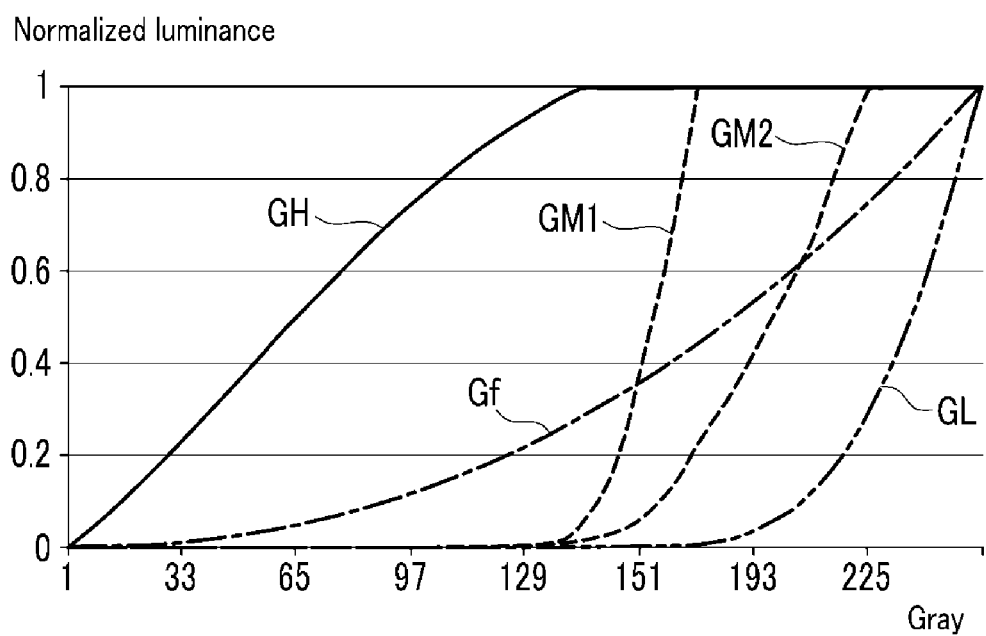
FIG. 14 is a graph illustrating a gamma curve of the display device according to an exemplary embodiment.

FIG. 13 is an equivalent circuit diagram of one pixel of a display device according to an exemplary embodiment, and FIG. 14 is a graph illustrating a gamma curve of the display device.

Referring to FIG. 13, the display device is almost the same as the exemplary embodiment shown in FIG. 5 described above, but may further include a second down capacitor Chd.

The second down capacitor Chd is connected between the first liquid crystal capacitor Clca and the second liquid crystal capacitor Clcb and includes a terminal connected with the output terminal of the first switching element Qa and the first liquid crystal capacitor Clca and a terminal connected to the output terminal of the second switching element Qb and the second liquid crystal capacitor Clcb. In the exemplary embodiment, the down switching element Qcs, the first down capacitor Cstd, and the second down capacitor Chd correspond to the voltage changing member described above.

A driving method of the display device shown in FIG. 13 is almost the same as the driving method according to the exemplary embodiment shown in FIGS. 5 to 7 described above. However, when the down switching element Qcs is turned on for the second period PD2 and the voltage of the second liquid crystal capacitor Clcb drops down, the charge voltage of the first liquid crystal capacitor Clca drops down through the second down capacitor Chd at the same time. Accordingly, the second luminance Lu_b of the second subpixel PXb for the second period PD2 is lower than the second luminance Lu_b for the first period PD1, and simultaneously, the first luminance of the first subpixel PXa for the second period PD2 is lower than the first luminance for the first period PD1.

As such, according to the exemplary embodiment, for one frame, the second luminance Lu_b of the image displayed by the second subpixel PXb may have two different luminances, and the first luminance of the image displayed by the first subpixel PXa may also have two different luminances. For one frame, the images displayed by the first and second subpixels PXa and PXb may be in accordance with four different gamma curves as shown in FIG. 14.

FIG. 14 is a diagram illustrating an example of a gamma curve according to an exemplary embodiment and illustrates a first gamma curve GH, a second gamma curve GL, a third gamma curve GM1, and a fourth gamma curve GM2 which are different from each other. Luminance of an image based on the first gamma curve GH may be higher than or the same as luminance of an image based on the third gamma curve GM1, the luminance of the image based on the third gamma curve GM1 may be higher than or the same as the luminance of an image based on the fourth gamma curve GM2, and the luminance of the image based on the fourth gamma curve GM2 may be higher than or the same as the luminance of an image based on the second gamma curve GL.

A composite gamma curve of the images in the first to fourth gamma curves GH, GL, GM1, and GM2 coincides with a defined front gamma curve Gf so as to be the most suitable for the display device, and a composite gamma curve at the side is controlled to be maximally close to the front gamma curve Gf, thereby improving side visibility. In this case, the first to fourth gamma curves GH, GL, GM1, and GM2 are controlled so that the composite gamma curve at the side does not have a maximum inflection point and is close to the front gamma curve Gf, thereby improving side visibility. Because the four gamma curves GH, GL, GM1, and GM2 are used, it may be easier to control the composite gamma curve at the side so as to be closer to the front gamma curve Gf as compared, for example, with the exemplary embodiment that uses the three gamma curves.

A detailed structure of a display device according to the exemplary embodiment shown in FIG. 13 will be described with reference to FIGS. 15 and 16.

Figure 15:
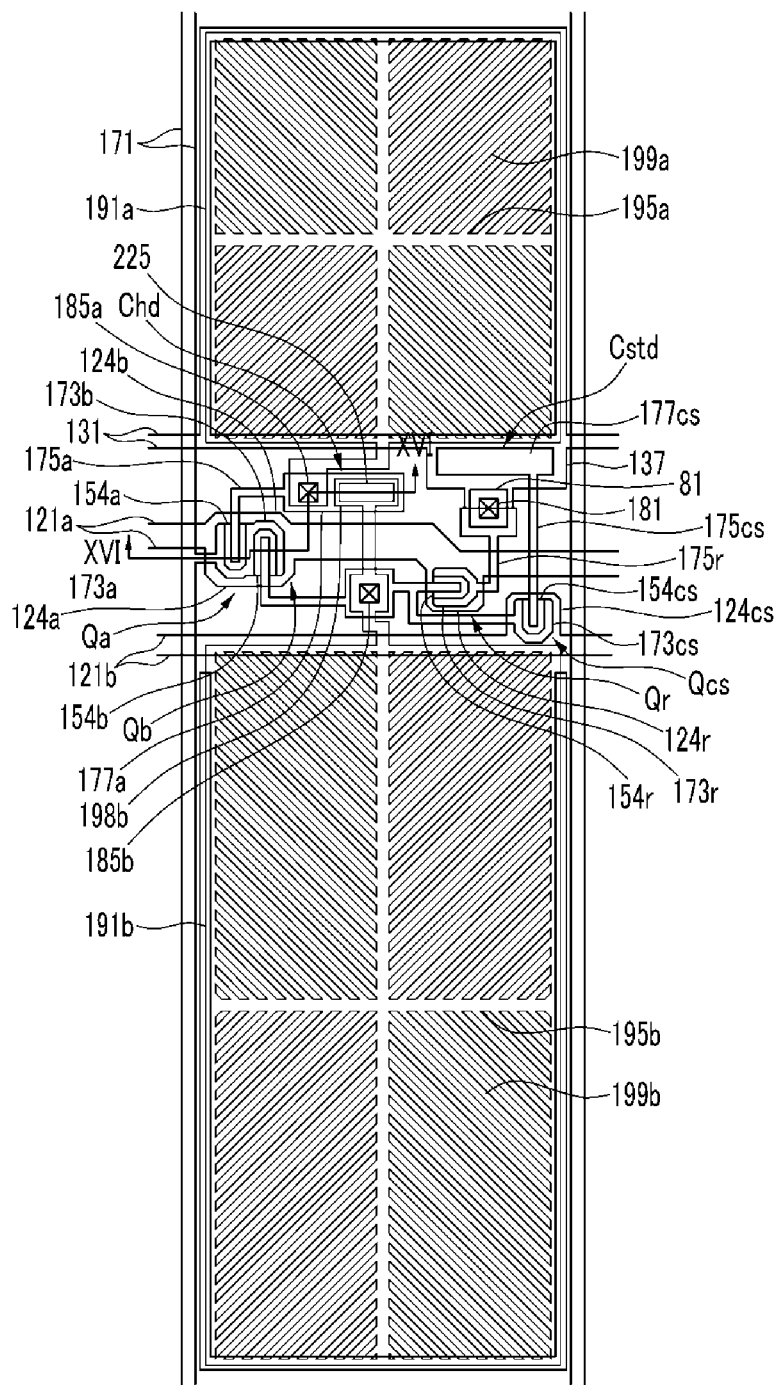
FIG. 15 is a layout view for one pixel of the display device according to an exemplary embodiment.
Figure 16:
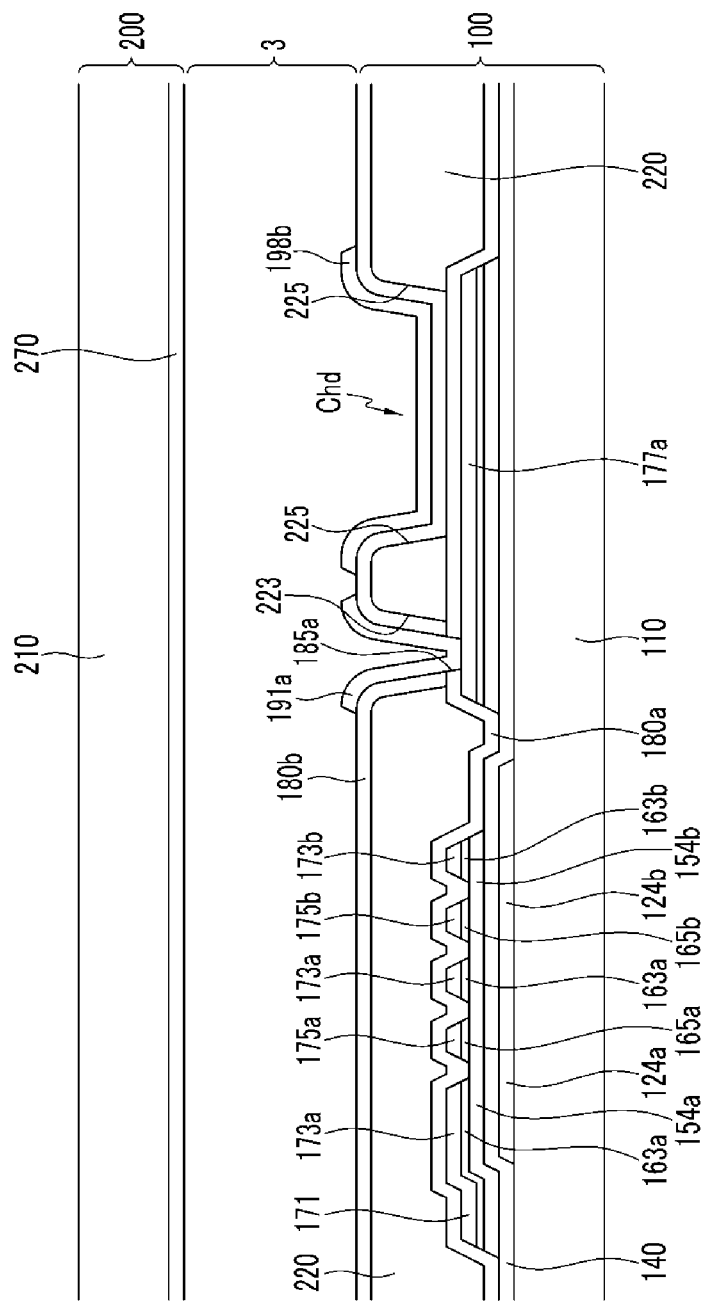
FIG. 16 is a cross-sectional view of the display device of FIG. 15 taken along line XVI-XVI.

FIG. 15 is a layout view for one pixel of the display device according to an exemplary embodiment, and FIG. 16 is a cross-sectional view of the display device of FIG. 15 taken along line XVI-XVI.

Because the structure of the display device shown in FIGS. 15 and 16 is almost the same as the structure of the display device shown in FIGS. 8 and 9, differences will be mainly described.

Referring to FIGS. 15 and 16, the first drain electrode 175a includes an extension 177a positioned at an end which does not face the first source electrode 173a.

A first passivation layer 180a is positioned on a data conductor, and a color filter (not shown) and the light blocking member 220 may be positioned thereon. A second passivation layer 180b may be positioned on the color filter and the light blocking member 220. The light blocking member 220 or the color filter may include openings 223 and 225 which are positioned on the extension 177a of the first drain electrode 175a.

The first passivation layer 180a and the second passivation layer 180b include a contact hole 185a which passes through the opening 223 of the light blocking member 220 or the color filter and exposes the extension 177a and the first drain electrode 175a.

The first subpixel electrode 191a and the second subpixel electrode 191b are positioned on the second passivation layer 180b. A part of the first subpixel electrode 191a is physically and electrically connected with the extension 177a of the first drain electrode 175a in the contact hole 185a. A part of the second subpixel electrode 191b is physically and electrically connected with the second drain electrode 175b in the contact hole 185b, and the part is extended again to form an extension 198b. The extension 198b of the second subpixel electrode 191b is positioned on the opening 225 of the color filter or the light blocking member 220 and is overlapped with the extension 177a of the first drain electrode 175a with the first passivation layer 180a and the second passivation layer 180b therebetween to form a second down capacitor Chd.

According to another exemplary embodiment, at least one of the color filter and the light blocking member 220 may be positioned on the upper panel 200. In this case, the color filter and the light blocking member 220 positioned on the upper panel 200 may not include an opening.

In addition, the first subpixel PXa and the second subpixel PXb may have various structures.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

DESCRIPTION OF SYMBOLS

3: Liquid crystal layer 81: Contact assistants
100, 200, 300: Display panel 110, 210: Substrate
121a, 121ah, 121al: Main-gate line 121b: Sub-gate line
131: Reference voltage line 140: Gate insulating layer
154a, 154b, 154r, 154c: Semiconductor
171, 171a, 171b: Data line
173a, 173b, 173r, 173cs: Source electrode
175a, 175b, 175r, 175cs: Drain electrode
180, 180a, 180b: Passivation layer
181, 185a, 185b: Contact hole
191a, 191b: subpixel electrode 220: Light blocking member
230: Color filter 250: Overcoat
270: Opposed electrode 400: Gate driver
500: Data driver 600: Signal controller
650: Memory 800: Gray voltage generator

What is claimed is:

1. A display device, comprising:
a pixel including a first subpixel and a second subpixel;
a main-gate line and a sub-gate line which are connected with the pixel,
wherein the first subpixel includes a first switching element connected with the main-gate line and a data line, and a first liquid crystal capacitor connected with the first switching element,
the second subpixel includes a second switching element connected with the main-gate line and the data line, and a second liquid crystal capacitor connected with the second switching element,
the pixel further includes a voltage changing member, the voltage changing member including a down switching element including a control electrode connected with the sub-gate line, and a first down capacitor connected to an output terminal of the down switching element and a terminal of a reference voltage, and
an input terminal of the down switching element is connected with the second liquid crystal capacitor,
wherein the second subpixel further includes a dividing switching element connected to the second liquid crystal capacitor and a terminal of the reference voltage.

2. The display device of claim 1, further comprising:
a gate driver configured to transmit a first gate signal to the main-gate line and to transmit a second gate signal to the sub-gate line, the first gate signal and the second gate signal being different from each other.

3. The display device of claim 2, wherein:
the first subpixel is configured to display a first image based on a first gamma curve during a first period of a first frame,
the second subpixel is configured to display a second image based on a second gamma curve during the first period of the first frame, the first gamma curve being different from the second gamma curve,
the voltage changing member is configured to change luminance of at least one of the first image and the second image when a second period of the first frame after the first period substantially starts, and
the first period begins when the first gate signal is a gate-on voltage, and the second period begins when the second gate signal is the gate-on voltage.

4. The display device of claim 3, wherein:
a phase difference between the gate-on voltage of the first gate signal and the gate-on voltage of the second gate signal which are input to the pixel for the first frame is from ⅕ to ½ of a total duration of the first frame.

5. The display device of claim 3, wherein:
a duration of the first period of the first frame is ⅕ to ½ of a total duration of the first frame.

6. The display device of claim 3, further comprising:
a data driver configured to transmit a first data voltage based on the first gamma curve and a second data voltage based on the second gamma curve to the pixel, and
wherein the data line transmits at least one of the first data voltage and the second data voltage.

7. The display device of claim 6, further comprising:
a second down capacitor connected between the first liquid crystal capacitor and the second liquid crystal capacitor.

8. The display device of claim 1, wherein:
the main-gate line includes a first main-gate line connected to the first subpixel and a second main-gate line connected to the second subpixel,
the first switching element is connected with the first main-gate line, and
the second switching element is connected with the second main-gate line.

9. A display device, comprising:
a pixel including a first subpixel and a second subpixel,
a main-gate line and a sub-gate line which are connected with the pixel,
wherein the first subpixel includes a first switching element connected with the main-gate line and a data line, and a first liquid crystal capacitor connected with the first switching element,
the second subpixel includes a second switching element connected with the main-gate line and the data line, and a second liquid crystal capacitor connected with the second switching element,
the pixel further includes a voltage changing member, the voltage changing member including a down switching element including a control electrode connected with the sub-gate line, and a first down capacitor connected to an output terminal of the down switching element and a terminal of a reference voltage,
an input terminal of the down switching element is connected with the second liquid crystal capacitor,
the main-gate line includes a first main-gate line connected to the first subpixel and a second main-gate line connected to the second subpixel,
the first switching element is connected with the first main-gate line, and
the second switching element is connected with the second main-gate line,
wherein the display device further comprises a second down capacitor connected between the first liquid crystal capacitor and the second liquid crystal capacitor.

10. A driving method of a display device including a pixel, the pixel including a first subpixel and a second subpixel, the method comprising:
applying a first data voltage based on a first gamma curve to a first switching element of the first subpixel and a second data voltage based on a second gamma curve to a second switching element of the second subpixel via a same data line at different times at a first period of a first frame, wherein a second liquid crystal capacitor that is connected to the second switching element is charged with a first charged voltage that is determined by a difference between the second data voltage and a common voltage;
during a second period of the first frame, applying a gate-on voltage to a down switching element of the pixel to discharge the first charged voltage of the second liquid crystal capacitor to a down capacitor connected to a terminal of a reference voltage, wherein the reference voltage is larger than the common voltage; and
changing a luminance of at least one of a first image displayed in the first pixel and a second image displayed in the second pixel, the first period following the second period in the first frame.

11. The driving method of a display device of claim 10, further comprising:
applying a first gate signal to the pixel when the first period of the first frame begins; and
applying a second gate signal to the pixel when the second period of the first frame begins.

12. The driving method of a display device of claim 11, wherein:
a phase difference between the gate-on voltage applied to the first gate signal and the gate-on voltage applied to the second gate signal is from $1/5$ to $1/2$ of a total duration of the first frame.

13. The driving method of a display device of claim 10, further comprising:
applying a same data voltage to the first subpixel and the second subpixel via a same data line during the first period; and
charging the second subpixel with a divided voltage of the data voltage.

14. The driving method of a display device of claim 10, further comprising:
applying a first data voltage based on the first gamma curve to the first subpixel and a second data voltage based on a second gamma curve to the second subpixel via a same data line at different times during the first period.

15. The driving method of a display device of claim 10, further comprising:
applying a first data voltage based on the first gamma curve to the first subpixel and a second data voltage based on a second gamma curve to the second subpixel via different data lines during the first period.

* * * * *